United States Patent [19]

Yamaoka et al.

[11] Patent Number: 4,784,013
[45] Date of Patent: Nov. 15, 1988

[54] HST SYSTEM DRIVING APPARATUS

[75] Inventors: Kojiro Yamaoka, Nishinomiya; Koichiro Fujisaki, Kobe, both of Japan

[73] Assignee: Kanzaki Kokyukoki Mfg. Co. Ltd., Amagasaki, Japan

[21] Appl. No.: 928,098

[22] Filed: Nov. 7, 1986

[30] Foreign Application Priority Data

Nov. 20, 1985 [JP] Japan ............................ 60-179775[U]

[51] Int. Cl.[4] ................................................ F16H 57/02
[52] U.S. Cl. ..................................... 74/606 R; 74/467; 184/6.12
[58] Field of Search ..................... 184/6.12; 74/606 R, 74/467

[56] References Cited

U.S. PATENT DOCUMENTS

| | | | |
|---|---|---|---|
| 3,339,662 | 9/1967 | Hanson et al. | 180/54 |
| 3,766,722 | 10/1973 | Kamlukin et al. | 56/11.6 |
| 3,800,913 | 4/1974 | Schmitt | 74/606 R |
| 3,802,289 | 4/1974 | Chiek | 74/606 R |
| 3,922,931 | 12/1975 | Osujyo et al. | 74/745 |
| 4,091,905 | 5/1978 | Sieren et al. | 192/113 B |
| 4,294,131 | 10/1981 | Murayama | 74/740 |
| 4,304,141 | 12/1981 | Tone et al. | 74/15.2 |
| 4,513,834 | 4/1985 | Hayashi et al. | 180/70.1 |

FOREIGN PATENT DOCUMENTS

| | | | |
|---|---|---|---|
| 1915341 | 10/1970 | Fed. Rep. of Germany | 184/6.12 |
| 0187170 | 10/1984 | Japan | 74/606 R |

Primary Examiner—Leslie A. Braun
Assistant Examiner—Scott Anchell
Attorney, Agent, or Firm—Saidman, Sterne Kessler & Goldstein

[57] ABSTRACT

The present invention relates to a driving apparatus which is attached with a HST system transmission and used for a light tractor or the like and which is simple in construction and easy to assemble, inspect and repair.

3 Claims, 9 Drawing Sheets

HST SYSTEM DRIVING APPARATUS

BACKGROUND OF THE DISCLOSURE

The driving apparatus for a light tractor loaded thereon the HST system transmission has hitherto been well-known, for example, as disclosed in the U.S. Pat. No. 4,513,834.

However, for the conventional art a case for housing therein a transmission mechanism is separate from a case for housing therein a differential gear so that when the transmission mechanism or the differential gear is assembled, inspected or repaired, it is required to remove transmission mechanism case or the differential gear case. Therefore, the entire driving apparatus, when assembled, inspected and repaired, need be removed from the body of the tractor so as to take much time.

Conventionally, the HST system transmission loading surface and a portion of the transmission where lubricating oil mainly stays are provided in different cases, so that pipings and lubricating oil feed conduits from an oil filter provided at the lubricating oil stay portion to the HST system transmission must be provided across a plurality of the cases, the pipings and oil feed conduits need be removed from the driving apparatus when inspected or repaired, thereby taking much time.

SUMMARY OF THE INVENTION

In the construction of attaching the HST system transmission to the transmission case, the HST system transmission is complicated in its internal construction so as to be difficult to inspect or repair the transmission itself as being mounted on the tractor. An object of the present invention is to provide a support construction which even in the above case is easy to remove only the HST system transmission from the tractor without dismantling other components, such as a gearing mechanism or a differential gear.

Another object of the invention is to provide a driving apparatus which divides the transmission case into a case lid and a case body so as to enable assembly, inspection and repair of the transmission and differential gear even while attaching the transmission case to the tractor body, so that the HST system transmission loading surface and the lubricating oil staying portion are formed at the case body, thereby forming the case lid simply detachable from the driving apparatus as the case body and HST system transmission are residual at the tractor body.

Furthermore, still another object of the invention is to provide a driving apparatus which is provided at the same case with the HST system transmission attached thereto and the lubricating oil staying portion, so that pipings and oil conduits, which connect an oil filter and the HST system transmission, need not be dismantled when the case lid is divided from the transmission case.

The present invention constructed as abovementioned are advantageous as follows:

Firstly, the HST system transmission loading surface is formed on the upper surface of the case housing therein the transmission and differential gear, so that the case lid is removable while mounting the HST system transmission, thereby simplifying the assembly and disassembly of the transmission and differential gear and facilitating maintenance thereof.

Secondly, the oil filter is attached directly to the case body on which the HST system transmission is formed, so that the oil filter and pipings may be kept assembled even during the dismantling or assembling, whereby there is no fear that a foreign object, such as dust, enters into the oil filter or the piping each time the transmission and differential gear are disassembled or assembled.

Thirdly, the case body is bored at the wall thereof to form an oil feed conduit for the HST system transmission, whereby the piping connecting the lubricating oil staying portion at the transmission case with the HST system transmission is not required, thereby saving labor for assembly. Also, the oil feed conduit instead of the piping can protect the oil passage.

These and other objects of the invention will become more apparent in the detailed description and examples which follow.

DETAILED DESCRIPTION OF THE PREFERRED EMBODIMENT

Figure 1:
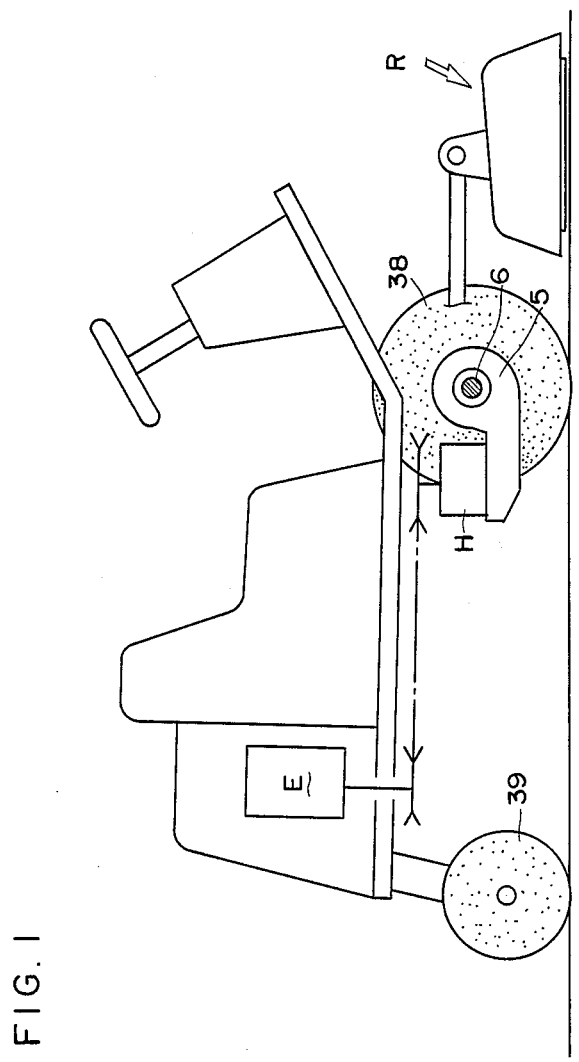
FIG. 1 is a general side view of a mowing tractor loading thereon an embodiment of a HST system driving apparatus of the invention.

Referring to FIG. 1, explanation will be given on construction of a HST system driving apparatus attached to a light tractor of the invention.

The tractor uses front wheels 38 as the driving wheels and rear wheels 39 as the steering control wheels, the front wheels 38 driving the HST system driving apparatus of the invention.

A mower R is attached to the tractor ahead of the front wheels in relation of being vertically movable.

An engine E is loaded on the rear portion of a traveling frame so as to transmit a driving force to the HST system transmission H through a V belt.

Figure 5:
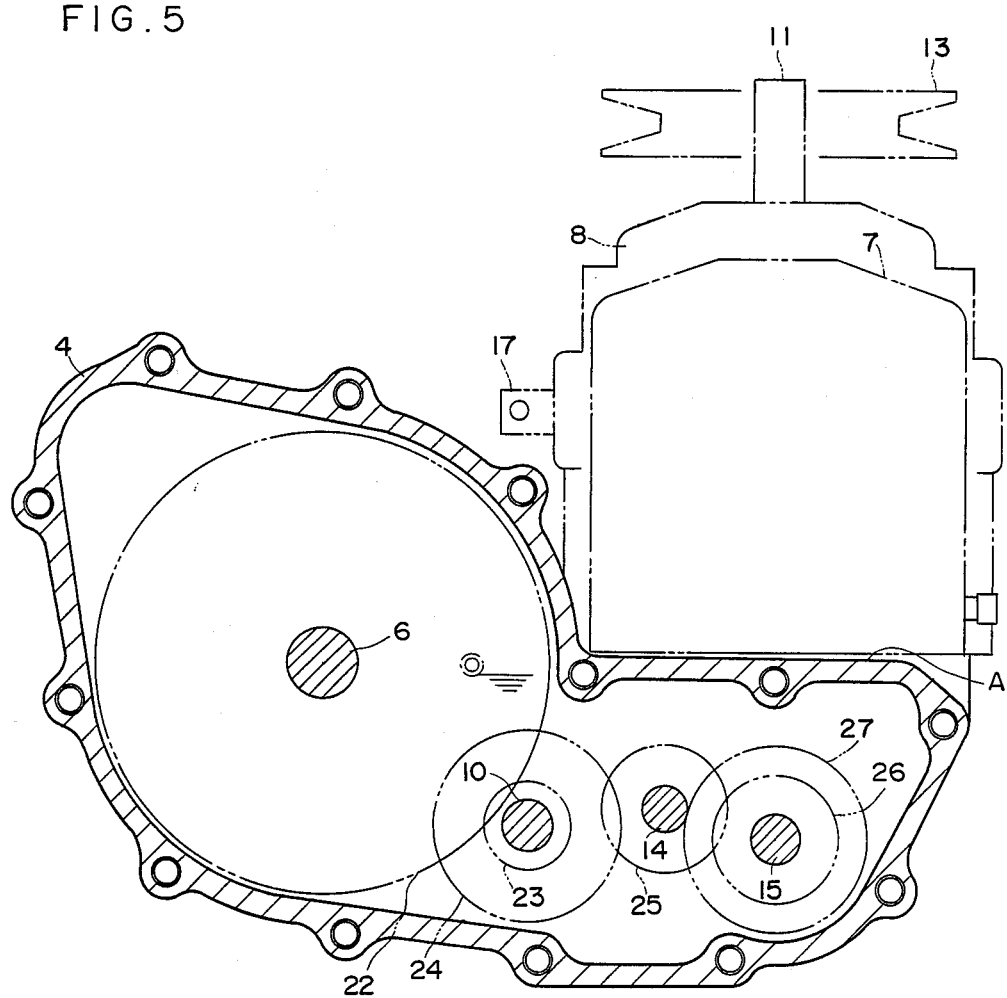
FIG. 5 is a sectional side view of the same.

The HST system transmission comprises a hydraulic pump 8 and a hydraulic motor 7 as shown in FIG. 5. In this embodiment, the HST system transmissions H juxtaposes laterally of the tractor body the hydraulic pump 8 and hydraulic motor 7. Alternatively, the HST system transmission H may vertically dispose the pump 8 and motor 7 vertically.

Referring to FIG. 5, an input V pulley 13 is fixed to a pump shaft 11 at the hydraulic pump 8 and the rotation of engine E is transmitted to the input pulley 13 through the V belt.

Next, explanation will be given on the entire construction of the HST system driving apparatus according to FIGS. 4, 5 and 6.

A speed change lever shaft 17 for rotating a swash plate of hydraulic pump 8 projects from the side surface thereof and rotates to allow the swash plate to rotate to change the discharge direction and a discharge amount of a pressure oil, thereby changing the direction and the number of rotations of the hydraulic motor 7 driven by the oil pressure.

In this embodiment, the transmission comprises gears 27, 26, 25, 24 and 23 and shafts 15, 14 and 10 for supporting these gears. Alternatively, the transmission may be of a chain type or attached with a transmission.

A bevel gear 28 is fixed to a motor shaft 29 at the hydraulic motor 7 and engages with the bevel gear 27 mounted on the input shaft 15. Another gear 26 is fixed thereon and engages with the gear 25 on a first counter shaft 14, the gear 25 engaging with the gear 24 on a second counter shaft 10, another gear 23 thereon engaging with a differential ring gear 22.

The differential ring gear 22 is fixed to a differential case 18 which rotates to rotate a pinion shaft 19 and each differential pinion 20 rotates on its axis and revolves around the axle, whereby differential side gears 21 rotate to allow right and left axles 6L and 6R to rotate.

Figure 4:
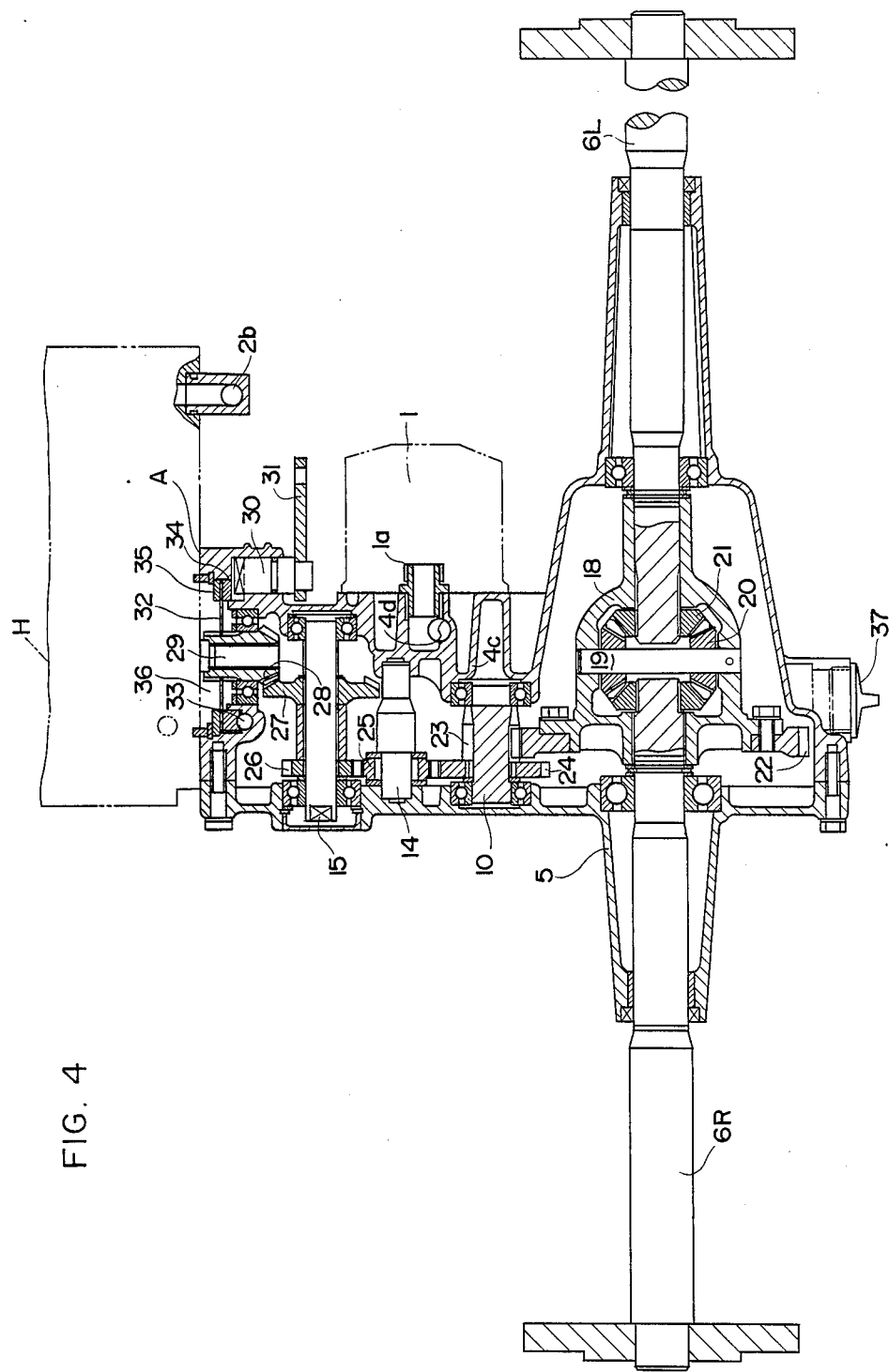
FIG. 4 is a plan view thereof.

The transmission case of the invention is divided laterally into two, in which a case body 4 is disposed at the right side in FIG. 4 and a case lid 5 closes an opening at the left side of case body 4.

Figure 6:
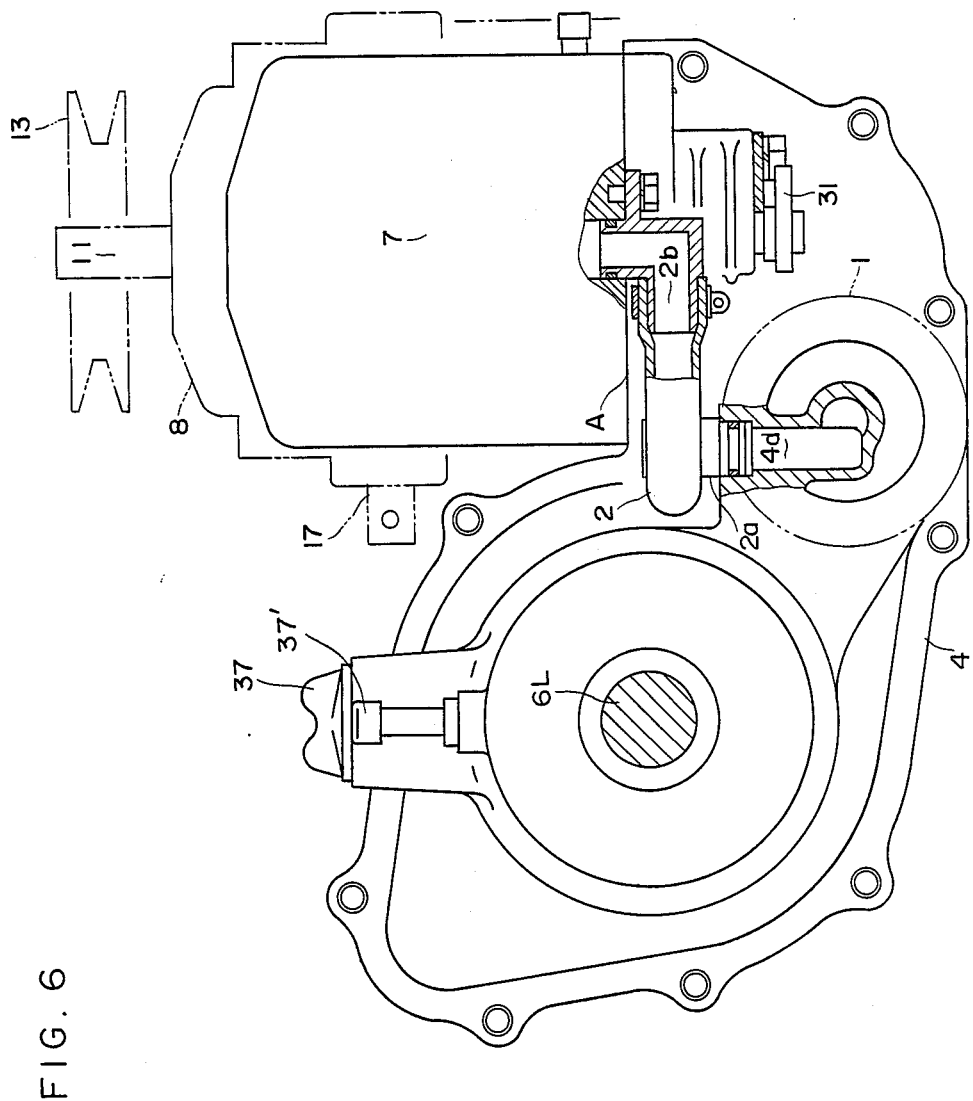
FIG. 6 is a side view of the same, showing a piping from an oil filter to a HST system transmission.
Figure 7:
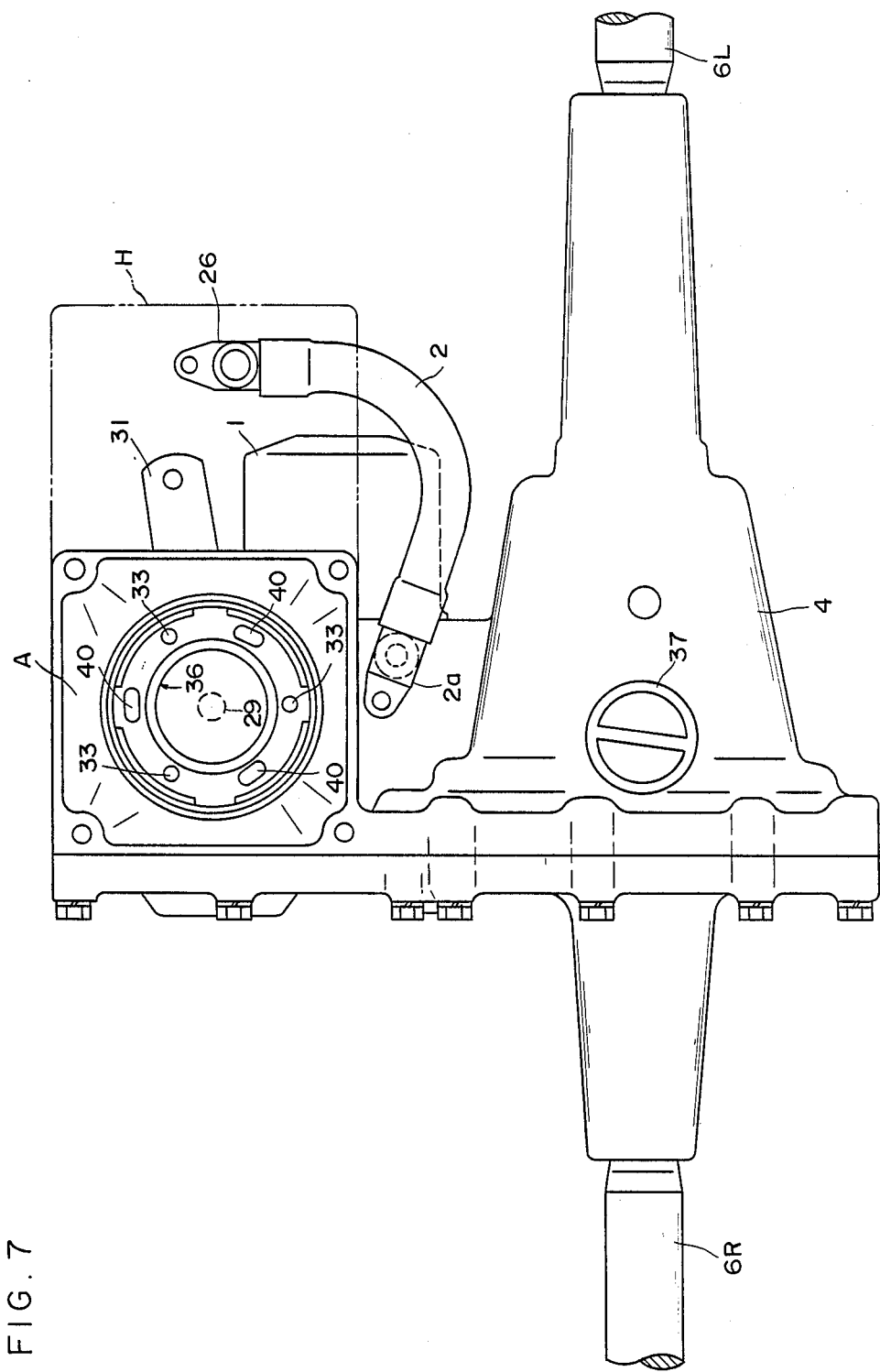
FIG. 7 is a plan view thereof.

As shown in FIGS. 5, 6 and 7, the upper surface of the case body 4 is made flat and used as a loading surface A for the HST system transmission, the loading surface A forming thereon an insertion bore 29 for the motor shaft 29.

Figure 8:
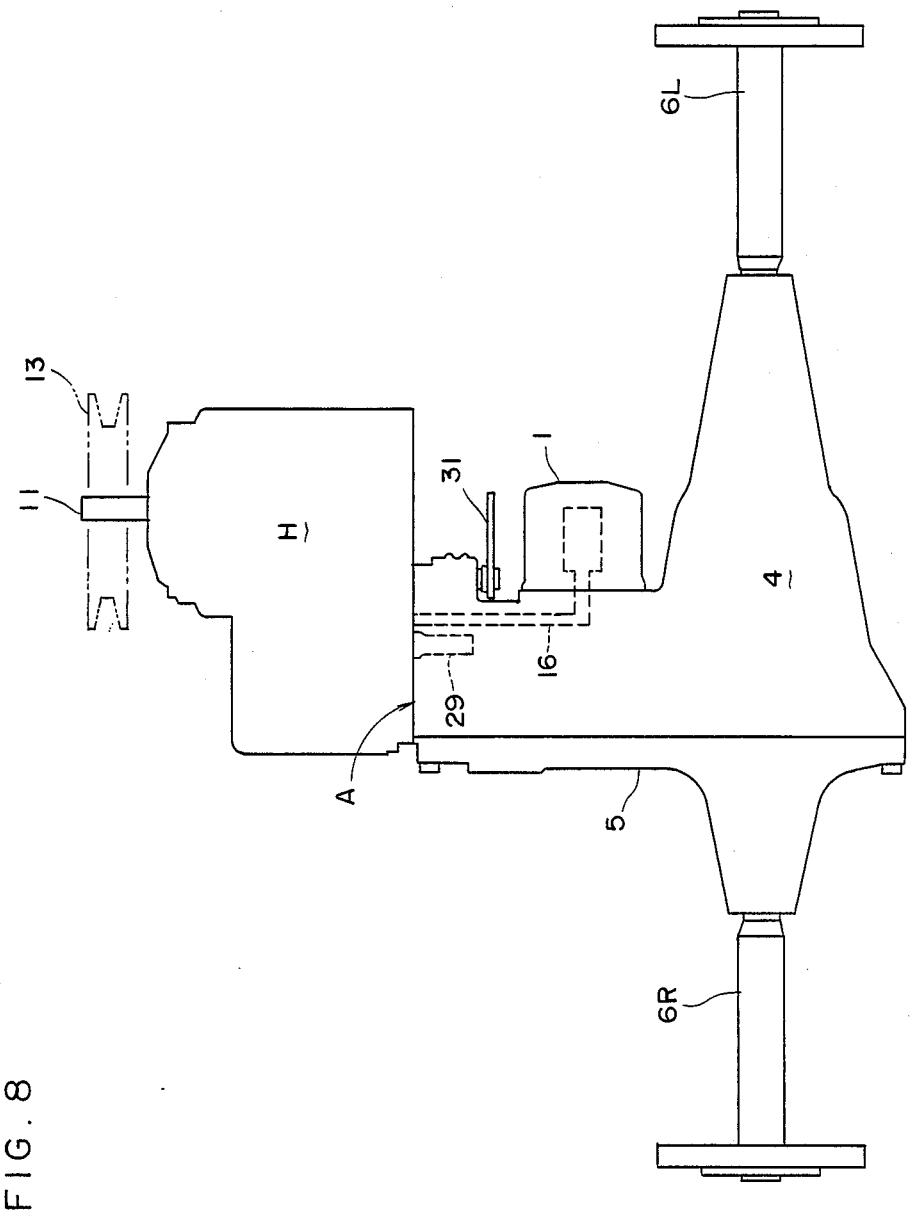
FIG. 8 is a development elevation of a modified embodiment of the driving apparatus of the invention, in which an oil passage instead of the piping is bored at the wall of a transmission case.

On the loading surface A is mounted the HST system transmission H. In addition, FIGS. 4, 8 and 9 are development views, in which the HST system transmission H loading surface is shown laterally of the transmission case, but actually loaded on the upper surface thereof as shown in FIGS. 5, 6 and 7.

Figure 9:
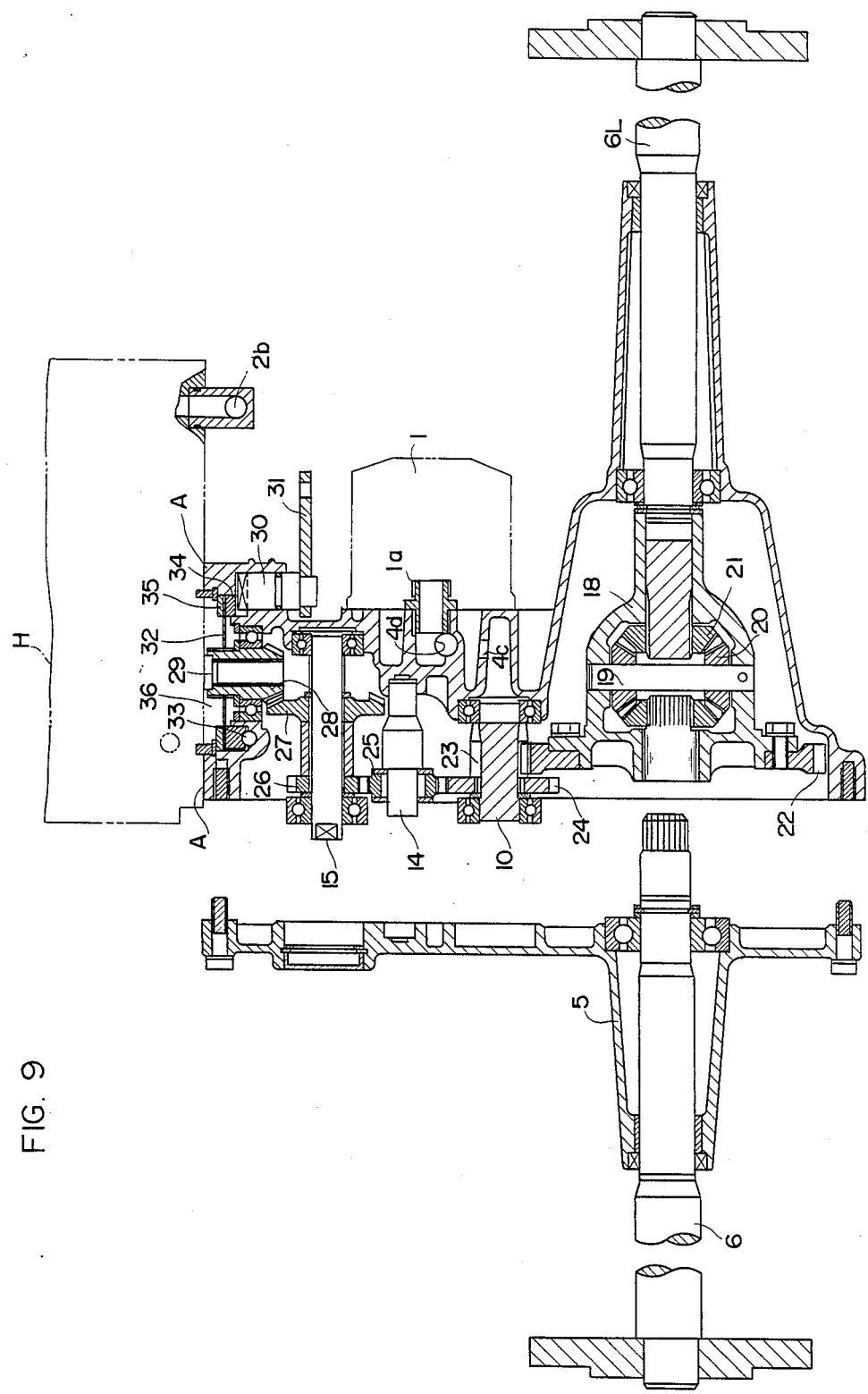
FIG. 9 is an exploded plan view of the embodiment of the HST system driving apparatus of the invention in FIG. 1.

FIG. 9 shows an exploded case of the HST system driving apparatus, in which the HST system transmission H loading surface A is formed at the case body 4 made larger in width in order to contain therein the transmission and differential gears, so that, when the case is exploded, the case lid 5 only is removed together with an axle 6R from the case body 4 while the HST system transmission H is kept mounted on the case body 4.

Hence, the shafts 15, 14 and 10 supporting the transmission and the differential gears are built in the case body 4 and then the case lid 5 closes the case body 4 and the shafts are inserted into shaft bores formed on the case lid 5 corresponding to the shafts respectively, thereby enabling the HST system driving apparatus to be assembled.

Simultaneously, splines provided at one end of the axle 6R supported to the case lid 5 are fitted into a spline bore at the side gear 21 disposed at the case body 4.

The HST system transmission H inserts only its motor shaft 29 into the bore 36 to thereby engage with the bevel gear 28 at the transmission.

Thus, the HST system transmission H fixedly engages with the gear transmission in such a manner that the HST system transmission H is fixed merely by use of bolts to the loading surface A at the case body 4 without dismantling the gear transmission within the case body 4. Also, for inspecting or repairing, the HST system transmission H is removed simply from the driving apparatus only by removing the bolts therefrom without leaking the lubricating oil out of the transmission case.

Referring to FIG. 4, a disc brake device is disposed in the insertion bore 36 for the motor shaft 29 of hydraulic motor 7.

Namely, splines are provided at the outer periphery of the bevel gear 28 fixed to the motor shaft 29 and retain a disc plate 32. An actuator 34 biases the disc plate 32 toward a disc plate 35 to thereby exert the braking action.

In addition, a cam shaft 30 is rotated by a brake arm 31 to thereby slide the actuator 34 toward the disc plate 32.

When the cam shaft 30 rotates the actuator 34, a cam ball 33 held at the bottom of the insertion bore 36 rides on the shallow portion at a cam-like-shaped ball insertion bore, thereby putting the disc plate 32 between the actuator 34 and the steel plate 35 for exerting the braking action.

In the above construction, the transmission case of the invention comprising the case body 4 and case lid 5 serves also as a tank for containing therein an operating oil for the HST system transmission A, a lubricating oil in the transmission case is filtrated through the oil filter 1 and fed to the HST system transmission H through the piping 2.

In FIG. 6, reference numeral 37 indicates a plug for an oil inlet for feeding therethrough a lubricating oil into the case body 4, and 37' designates a breather for air ventilation. The charged operating oil is taken in a charge pump or directly to the hydraulic pump 8 due to the kind of HST system transmission H, the oil filter 1 being fixed directly to the side wall of the case body 4 at the transmission case.

The oil filter 1, as shown in FIG. 4, is fixed to the right side wall of the case body 4 as shown. The lubricating oil within the transmission case is taken in through a suction bore 4c, filtrated in the oil filter 1, thereafter guided through an internal oil passage at a screw joint 1a to an oil feed bore 4d formed at the case body 4, received to the piping 2 through a joint 2a from the oil feed bore 4d open at the upper surface of the case body 4 as shown in FIG. 6, thereby being charged into the HST system transmission H.

In FIG. 7, arrangement of the piping 2 is shown in the plan view.

Figure 2:
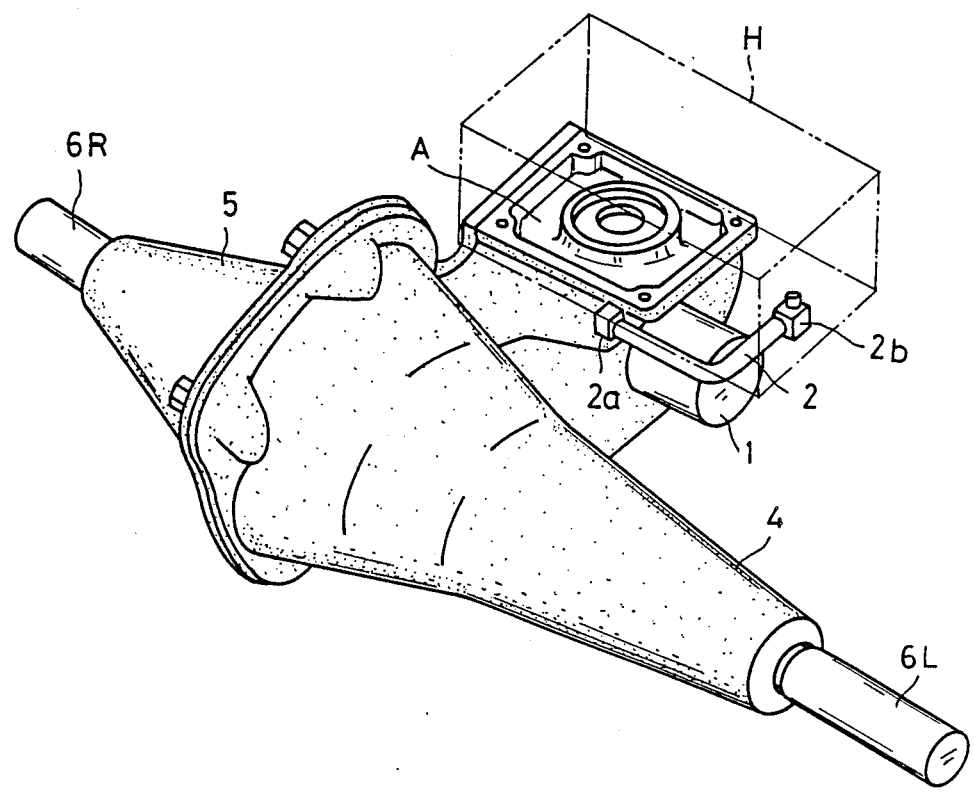
FIGS. 2 and 3 are perspective views of the HST system driving apparatus.
Figure 3:
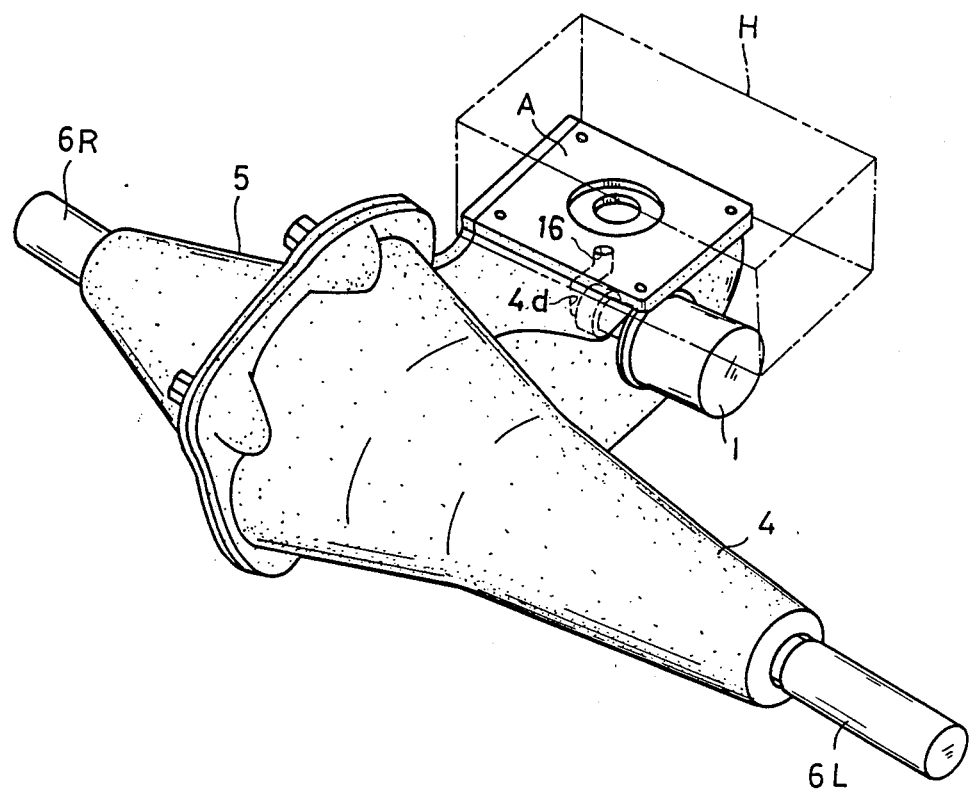

Referring to FIG. 2, an embodiment of the invention is shown, in which the operating oil is charged from the oil filter 1 to the hydraulic pump 8 through the piping 2. FIGS. 3 and 8 show a modified embodiment of the invention, in which an oil feed conduit 16 in place of the piping 2 is provided at the side wall of the case body 4, whereby the operating oil is charged from the oil filter 1 to the HST system transmission H through the oil feed conduit 16.

In detail, the oil feeding conduit 16 communicates with the oil feed bore 4d to be open at the HST system transmission loading surface A, the suction bore for the HST system transmission H is formed similarly onto the loading surface A in relation of opposing to the oil feed conduit 16.

Thus, the oil feed conduit 16 from the oil filter 1 to the HST system transmission H is formed of an oil conduit bored through the side wall of the case body A, thereby feeding the operating oil through the junction face between the HST system transmission loading surface A at the case body 4 and the HST system transmission H. As a result, the piping is not required and the time for assembly is largely saved.

Next, explanation will be given on operation based on the above construction.

The rotation of the engine mounted on the frame of the apparatus is transmitted to the hydraulic pump 8 at the HST system transmission H through a V belt and a pulley 13 to thereby rotate the pump 8, the pressure oil discharged from the hydraulic pump 8 is fed to the hydraulic motor 7 to rotate the motor shaft 29 changing the speed, and a driving force is transmitted therefrom to the gear transmission. Hence, the differential ring gear 22 at the differential gear is rotated by the gear transmission, thereby driving the axles 6L and 6R.

The oil filter 1, the principal portion of the invention, is fixed to the wall of the case body 4 and supplies the operating oil to the hydraulic pump 8 through the piping 2 or the oil feed conduit 16 bored through the wall of the body case 4.

In addition, in FIG. 7, reference numerals 40 designate bores to return the operating oil from the hydraulic motor into the transmission case.

While a preferred embodiment of the invention has been described using specific terms, such description is for illustrative purpose only, and it is to be understood that the changes and variations may be made without departing from the spirit or scope of the following claims.

What is claimed is:

1. A driving apparatus for a tractor, comprising:
   an axle;
   a differential gear unit for driving said axle;
   a speed change mechanism;
   a transmission mechanism for transferring power from said speed change mechanism to said differential gear unit;
   a casing, said casing comprising a case lid and a case body attached to said tractor for housing said differential gear unit and said transmission mechanism, wherein said transmission mechanism comprises at least one shaft, said shaft having a first end rotatably supported by said case body and a second end rotatably supported by said case lid, said case body and said case lid interface substantially at one end of said shaft of said transmission mechanism;
   a loading surface provided on an outside surface of said case body for mounting said speed change mechanism;
   means for detachably securing said case body and said case lid together, said detachably securing means including means for detaching said case lid from said case body for servicing said driving apparatus so that said differential gear unit and said transmission mechanism remain housed within said case body;
   means provided by said casing for holding oil used by said speed change device wherein said oil serves to lubricate said transmission mechanism and said differential gear unit; and
   means provided by said casing for receiving an oil filter for filtrating said oil.

2. The driving apparatus of claim 1 further comprising a conduit for transferring oil from said casing to said speed change mechanism.

3. The driving apparatus of claim 1 further comprising piping for transferring oil from said casing to said speed change mechanism.

* * * * *